United States Patent Office 2,785,987
Patented Mar. 19, 1957

2,785,987

CEMENTITIOUS MATERIAL CONTAINING SLATE FLOUR

Charles L. Blake, Windgap, Pa.

No Drawing. Application November 25, 1952, Serial No. 322,575

6 Claims. (Cl. 106—99)

This invention relates to cementitious material such as used for roofing or siding and it has for its primary object to provide a cementitious material containing a relatively high percentage of finely ground slate, so-called slate flour, which is a waste material resulting either from the working of slate or from the grinding of slate material which cannot be worked. The above named primary object includes the use of as high a percentage as possible of slate flour or finely ground slate as is consistent with the production of high class roofing or siding material. The cementitious material according to the invention may also be used as a filler and as an insulating material. When used as a filler it may be used in connection with rubber, plastics, linoleum, asphalts or ceramics.

A further primary object of the invention consists in a re-cycling process for producing the above described cementitious, slate flour containing material which re-cycling process permits to embody into the cementitious material a maximum percentage of slate flour which produces, or is consistent with, a high quality of the products.

The addition of slate flour by means of the above mentioned re-cycling process not only lowers the production cost of the cementitious material by utilizing low cost refuse material but also markedly improves the cementitious material by making it waterproof to a certain extent and in any case less absorbent of moisture. Moreover, also the slate flour has binding qualities which assist those of the Portland cement which goes into the mixture.

According to the invention a basic mix is made which consists approximately of slate flour, Portland cement and asbestos fiber, the slate flour forming nearly but not quite one-half of this mixture. This mixture is treated with sufficient water to allow binding and hardening of the cement, the quantity of water being somewhat larger than that necessary for producing a reaction of the cement on account of the fact that the other materials also absorb some water. After the binding and hardening of the cement it is allowed to cure for some time which time is usually forty-eight hours. The hardened material is then again ground or pulverized so as to form a kind of flour. Now again the basic mix is made consisting of slate flour, Portland cement and asbestos fiber but to this basic mix about 20% of the ground material is now added, the other materials being, of course, reduced in proportion. This material may now be used itself or again some of it may be hardened and may be added to the basic mix of slate flour, Portland cement and asbestos fiber.

In this way a material of great strength of good insulating quality, which is much less absorbent for moisture than cement, and which can also be nailed, is produced.

In order to speed up the reaction and to increase the strength of the material it is possible to add some chlorine containing material in a small quantity of approximately 1%. Sodium chloride, for instance, can be added to the dry mix or may be added in the water which is used to react with the cement.

The finished product may be made completely water repellent by spraying a solution with a small percentage of wax or a plastic solution on the surface of the material.

*Example*

The slate flour, as above stated, is a waste material obtainable from many kinds of slate. It has the following composition in the example given below.

| | Percent |
|---|---|
| Silica | 55 to 67 |
| Alumina | 11 to 23 |
| Ferric oxide | 5 to 9 |
| Potash | .1 to 5 |
| Soda | .5 to 4 |
| Magnesia | .5 to 5 |
| Lime | .5 to 5 |
| Water | 2 to 4 |

Slate flour, made by finely grinding a slate of the above composition, constitutes the slate flour mentioned in the following example.

The starting or basic mix which is now made consists of

| | Percent |
|---|---|
| Slate flour | 47 |
| Portland cement | 35.3 |
| Asbestos fiber | 17.7 |

To this starting or basic mixture water is added so as to produce binding and hardening of the cement. After the hardening has been completed the hardened mixture is allowed to cure for forty-eight hours at room temperature.

A further basic mixture is now made which however also includes some of the hard material. This hard material is ground into a flour and around 20% of the mixture now consists of hardened material, ground as above stated. The mixture has the following composition:

| | Percent |
|---|---|
| Slate flour | 37.6 |
| Portland cement | 28.24 |
| Asbestos fiber | 14.16 |
| Ground material | 20 |

The material thus produced which is again treated with water so as to cause hardening and binding of the cement may be used such as it is or a still further re-cycling process may take place, some of the mixture last mentioned being added again to the basic mixture.

Preferably, the mixture which has been made in the above described manner may be shaped to form siding or roofing slabs which are then mounted in the conventional manner. They may be fixed by nails as the mixture such as described permits the use of nails which firmly grip the material.

The slate flour slabs may also be so formed that they only form a thin veneer with which slabs made from other material may be united. Such veneer plates may be fastened on bottom and on top of plates of other material. On account of their water resistance and also on account of the slate color which the slate flour additionally imparts to the cementitious mixture thus made the slabs or veneers made of the mixture are a perfect substitute for other and more expensive roofing and siding materials.

As above stated such siding or roofing slabs or veneers may be sprayed preferably with one of the commercially available resinous plastic solutions in order to make them completely water repellent.

It will be clear that the above described process as well as the above described composition may be changed in many ways and especially the less essential parts of the composition may be changed without in any way departing from the essence of the invention as defined in the annexed claims.

What is claimed as new is as follows:

1. A process for producing a cementitious mixture containing a high percentage of slate flour which comprises preparing a first basic mixture consisting of slate flour, Portland cement and asbestos fiber, the slate flour content approximating 50% of the said first basic mixture and the proportion of Portland cement and asbestos fiber being substantially 2:1; adding to the mixture sufficient water to harden the cement and curing the same for 48 hours; pulverizing the hardened mixture; preparing a second basic mixture with a slate flour content approximating 40% of said second basic mixture and with a proportion of Portland cement and asbestos fiber of 2:1; adding to said second basic mixture a quantity of the pulverized hardened first basic mixture approximating 20% of the said second basic mixture; adding water to harden the second basic mixture and curing the same for a period of approximately 48 hours.

2. The process as claimed in claim 1 wherein the product obtained by the process according to claim 1 is again pulverized and is added to a basic mixture of slate flour, Portland cement and asbestos fiber to the extent of about 20% of the said last named mixture, which last named mixture has a slate flour content of approximately 40%, the proportion of Portland cement to asbestos fiber being 2:1 and in adding water for hardening the cement and curing the same.

3. A process for producing a cementitious mixture containing slate flour comprising making a basic mixture containing 47% of slate flour, 35.3% of Portland cement, 17.7% of asbestos fiber, adding to the mixture a quantity of water sufficient to produce hardening of the cement, curing of the mixture to which the water has been added after hardening during forty-eight hours, pulverizing the hardened mixture finely so as to obtain a flour, making again a basic mixture consisting of 37.6% of slate flour, 28.24% of Portland cement, 14.16% of asbestos fiber and 20% of the ground material obtained by the above mentioned process steps, adding to the last named mixture sufficient water to harden the cement and curing the hardened cement during forty-eight hours.

4. A cementitious material consisting essentially of 37.6% of slate flour, 28.24% of Portland cement, 14.16% of asbestor fiber, and 20% of a ground finely pulverized material with water for hardening added which ground finely pulverized material itself consists of 47% of slate flour, 35.3% of Portland cement, and 17.7% of asbestos fiber to which water for hardening has been added.

5. A cementitious composition for sidings, roofings, etc. adapted to be shaped into slabs, plates or sheets and adapted to be used as a veneering material, consisting essentially of a hardened and cured basic mixture of slate flour, Portland cement and asbestos fiber in the approximate proportion of 2½:2:1 and of a finely ground mixture added to the extent of approximately 20% of the first named basic mixture, said added finely ground mixture consisting itself of a previously hardened, cured and pulverized mixture of slate flour, Portland cement and asbestos fiber with a slate flour content approximating 50% of the mixture with a proportion of Portland cement to asbestos fiber approximating 2:1.

6. A cementitious mixture according to claim 5 wherein approximately 1% of sodium chloride is added to the basic mixture.

References Cited in the file of this patent

UNITED STATES PATENTS

| | | |
|---|---|---|
| 186,647 | Weiland | Jan. 23, 1877 |
| 1,385,757 | Smith | July 26, 1921 |
| 1,610,203 | Covell | Dec. 7, 1926 |
| 2,246,537 | Rembert | June 24, 1941 |
| 2,456,643 | Napier | Dec. 21, 1948 |

FOREIGN PATENTS

| | | |
|---|---|---|
| 12,957 | Great Britain | of 1895 |